(No Model.) 4 Sheets—Sheet 4.
N. YAGN.
APPARATUS FOR FACILITATING WALKING, RUNNING, AND JUMPING.
No. 420,179. Patented Jan. 28, 1890.
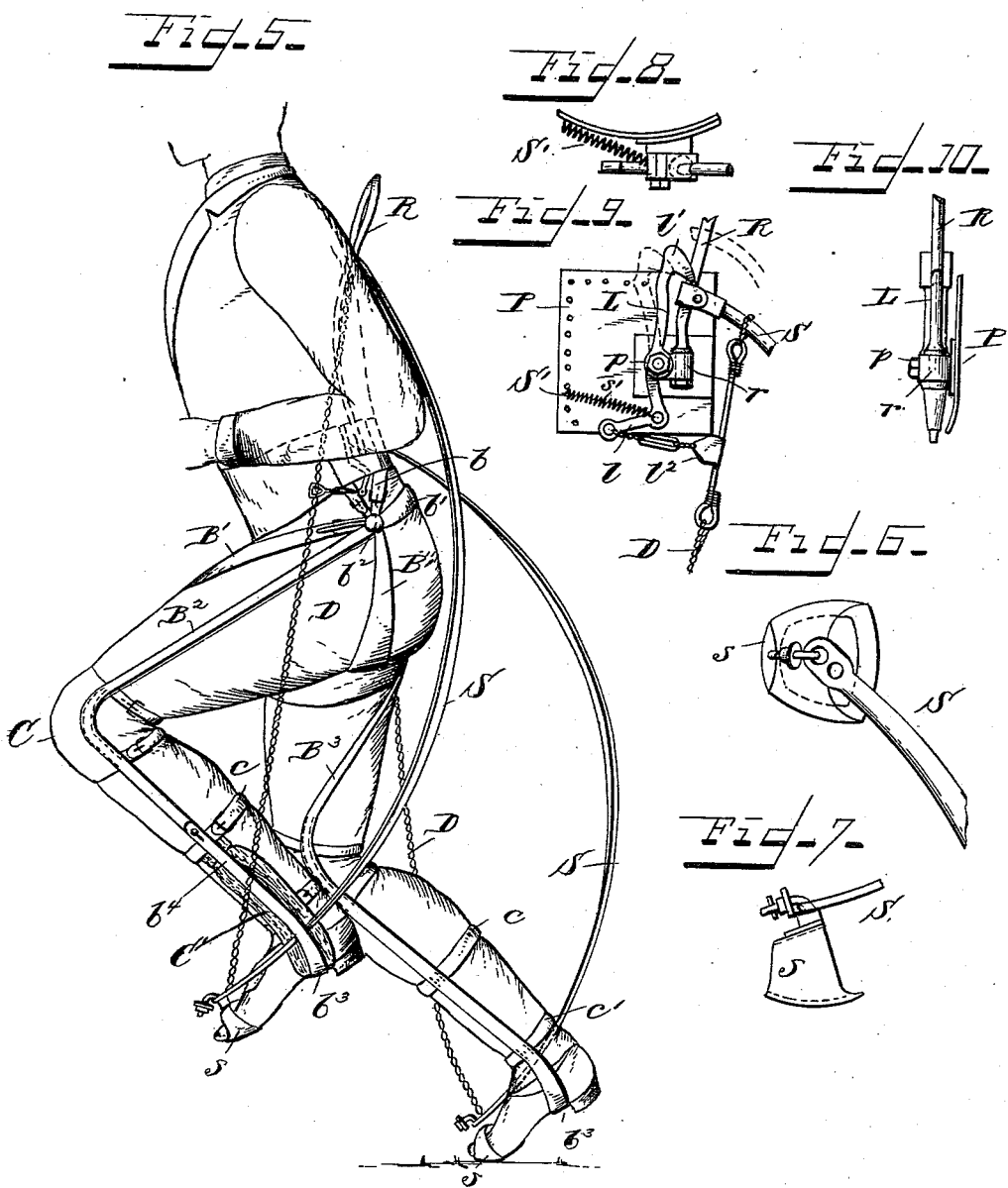

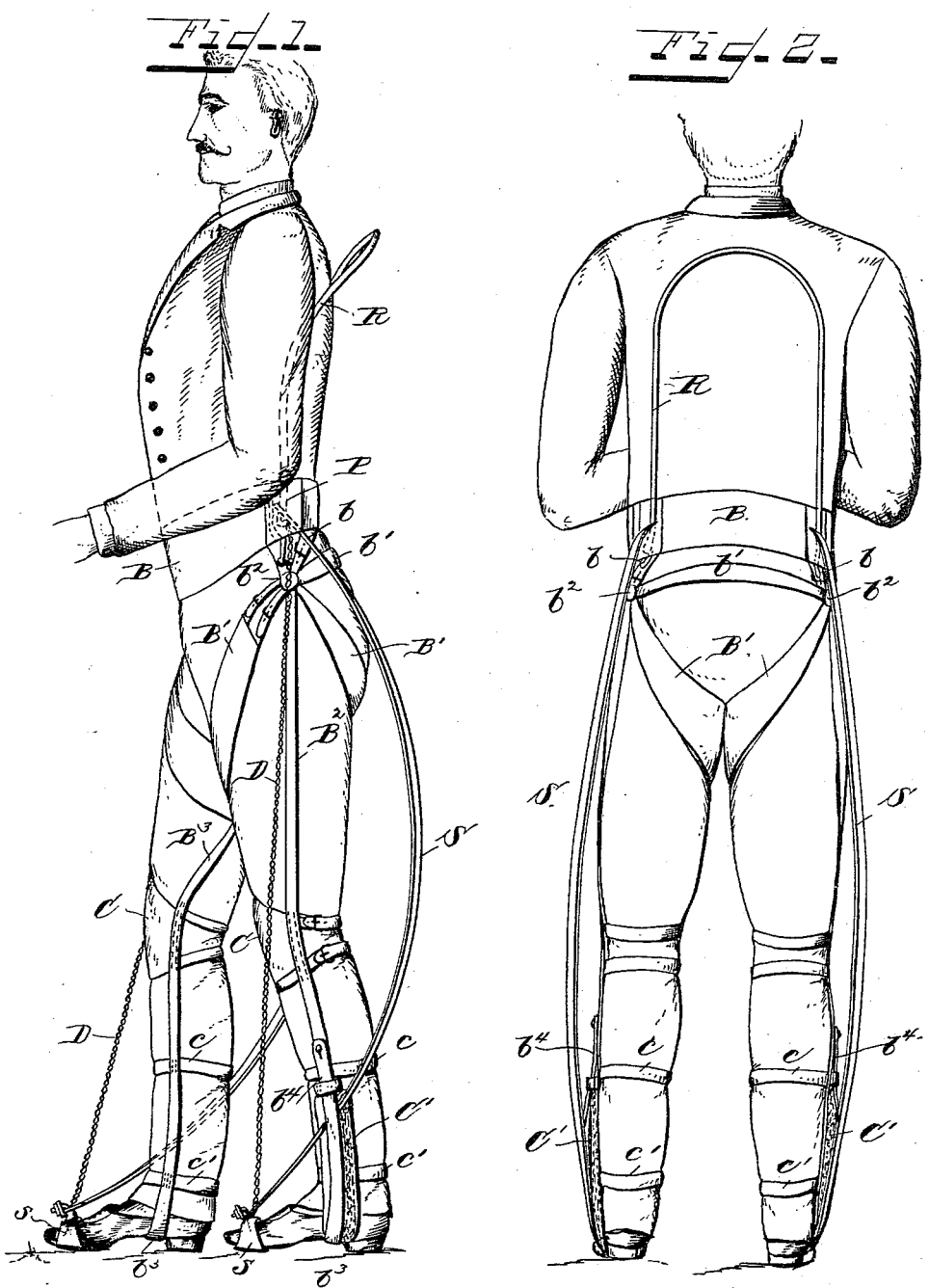

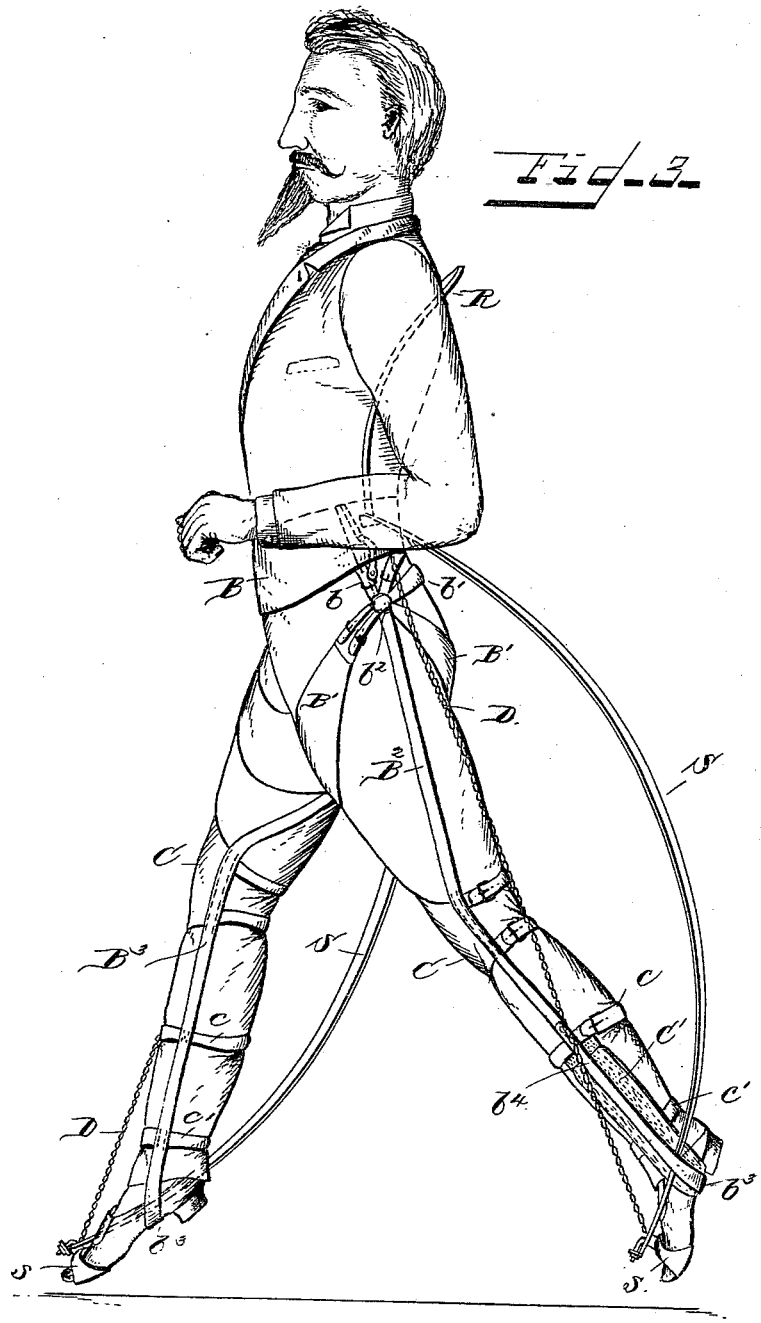

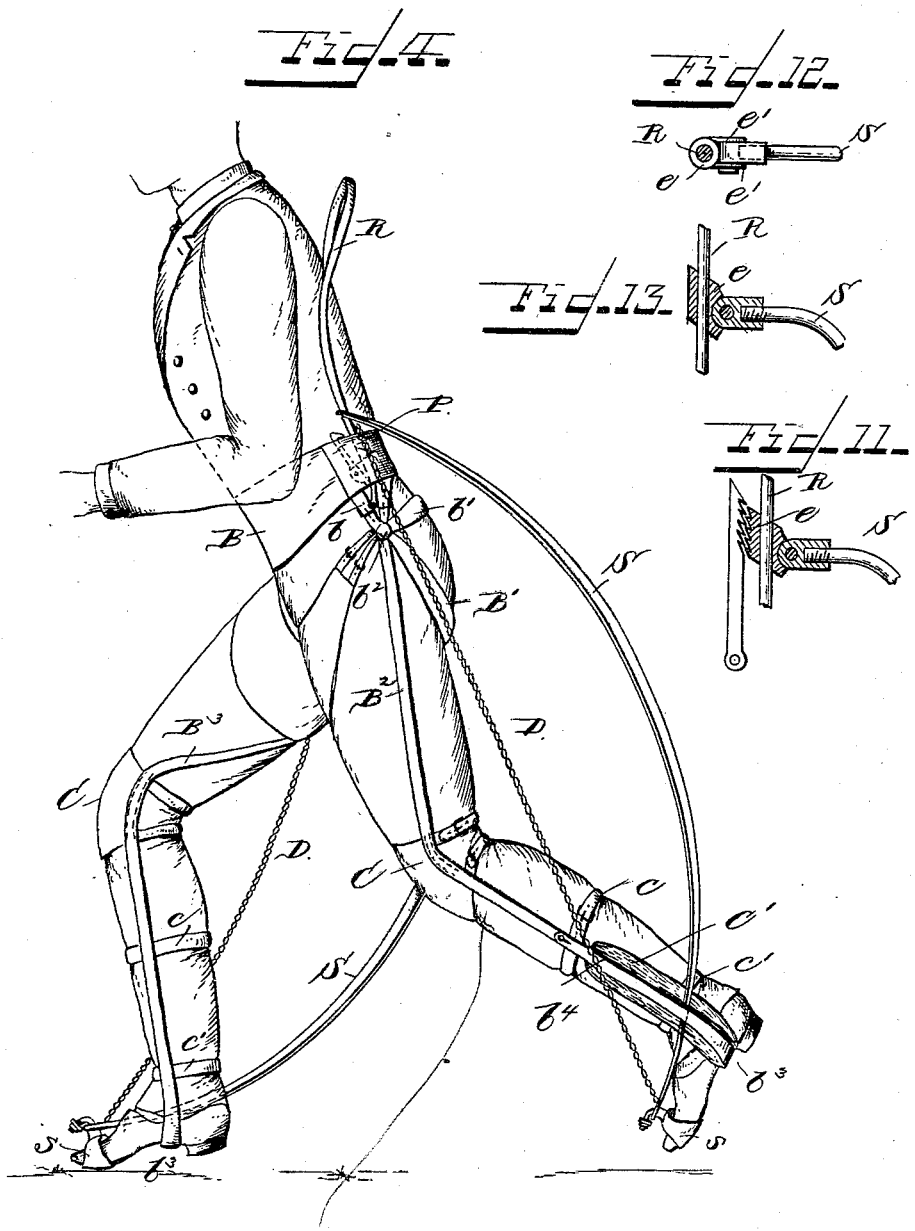

UNITED STATES PATENT OFFICE.

NICHOLAS YAGN, OF ST. PETERSBURG, RUSSIA.

APPARATUS FOR FACILITATING WALKING, RUNNING, AND JUMPING.

SPECIFICATION forming part of Letters Patent No. 420,179, dated January 28, 1890.

Application filed July 25, 1889. Serial No. 318,630. (No model.)

*To all whom it may concern:*

Be it known that I, NICHOLAS YAGN, a subject of the Russian Emperor, residing at St. Petersburg, Russia, have invented certain new and useful Improvements in Apparatus for Facilitating Walking, Running, and Jumping, of which the following is a description.

Figure 1 shows my improved apparatus for facilitating walking and running, in side elevation, in its application to the human body, the parts being shown in their respective positions when said body is at rest. Fig. 2 shows the same in rear elevation; and Figs. 3, 4, and 5 show the same in side elevation and in positions the parts assume in walking, running, and leaping. Figs. 6 and 7 show by a top plan view and side elevation one of the stirrups to which the lower end of the bow-springs is attached. Figs. 8, 9, and 10 are detail views illustrating the means for locking the upper end of the bow-springs against vertical motion, Fig. 11 being a sectional detail view of a modification of the said means; and Figs. 12 and 13 are detail views illustrating one mode of connecting the upper end of the bow-springs with the guide-rod therefor.

The invention relates to apparatus for facilitating walking, running, and leaping, and has for its object certain improvements on similar apparatus for which I have obtained Letters Patent of the United States, dated July 2, 1889, No. 406,328, and for which I have filed an application for Letters Patent on or about June 13, 1889, Serial No. 314,142.

The object of the invention is to provide improved means for increasing the efficiency of the apparatus and still further decreasing the fatigue inherent to the act of walking, running, or jumping, and also to so construct the apparatus as to enable the person using the same to more easily bend the legs; and to these ends the invention consists in structural features and combinations of parts, substantially as hereinafter fully described, and as set forth in the claims.

In the apparatus shown and described in my said Letters Patent the accumulated or stored-up power is applied by the springs to the lower part of the body, thus leaving the upper part thereof free to move in every direction, yet the connection of the springs by which the power is stored up or accumulated with the body and legs is such as not to permit a perfectly free and easy flexure of the legs, while in the apparatus shown and described in my said application for patent, although freedom of flexure is secured to the legs, the free motion of the upper part of the body is more or less impeded by the connection of the upper end of the power-springs at a point immediately under the arms.

The improvements which I am about to describe insure perfect freedom of flexure and motion to both the legs and body, and this I secure by applying the stored-up power at a point intermediate of the two extremes and by providing means to give free motion to the power-springs when they are not storing up or accumulating power or delivering such.

The harness in my present invention consists of a waist-belt B, thigh straps or bands B', and inner and outer leg-straps $B^2 B^3$. The thigh or seat bands or straps B' are connected together by a back cross-strap b', and are jointed to the outer leg-straps $B^2$ at a point $b^2$, from which extend two small suspender-straps b, that connect the thigh and outer leg straps to the waist-belt B. The inner leg-straps $B^3$ extend around the shoe or boot in front of the heel, and are at that point enlarged to form a stirrup $b^3$; thence they extend along the outer part of the leg to a point about midway between the foot and knee, at which point the extensions $b^4$ are buckled or buttoned to the outer leg-strap $B^2$, the upper end of the inner leg-straps being secured to the thigh-straps B', as best shown in Figs. 4 and 5.

In order to prevent any interference of the leg-straps with the free motion of the legs, and also to prevent said straps from becoming entangled or catching in anything, they are strapped to the legs by means of a knee-cap C, a strap c between the knee and foot or at the point of connection between the ends of the outer and inner leg-straps, and by means of an ankle-strap c'. In this manner the harness is firmly secured to the legs and supported from the waist without interfering with the motion or flexure of the latter, leaving the upper part of the body perfectly free.

S S are the two bow-springs, the lower end of which is secured to a stirrup s, in the manner substantially as shown and described in my said pending application for patent, while the upper end of said springs, instead of being connected with the upper end of the body, as described in my said application, is connected to the body at a point substantially midway of its length, or at the waist.

To prevent lateral motion of the springs, the lower end thereof passes between the end $b^4$ of the inner leg-straps $B^3$ and the leg, a cushion $C'$ being interposed to protect the leg.

Instead of rigidly connecting the upper end of the bow-springs S to the body or waist-belt, I provide a connection of such a construction that it will permit a free vertical motion to the spring ends when the legs are bent in walking, running, or leaping to facilitate the bending of the legs, and that will lock said springs against vertical motion when the weight of the body is brought upon the springs in order to store up or accumulate the power usually taken up by the leg-muscles and give up such power at the proper time. To this end the waist-belt B is provided with two plates P—one for each spring—and as the devices secured to or connected with said plates are mere duplications the description of one set of said devices will suffice for the comprehension thereof.

The plate P has a fulcrum stud or pin $p$, on which is fulcrumed a locking-lever L, the lower arm of which is a bell-crank $l$, and is connected with plate P by a spring $S'$, one end of which is fastened at the apex of the angle of the bell-crank. The upper arm of lever L terminates in a forked hook $l'$, that straddles the leg of a U-shaped or bow guide-rod R, the end of which leg is secured in a bearing $r$, formed on plate P. The hook $l'$ is held to the guide-rod R by the spring $S'$, and forms the abutment for the upper end of the bow-spring S; hence it prevents all motion of the spring in a vertical direction beyond said point, which is at a sufficient distance above the bearing $r$ for the rod R to admit of the spring being compressed when the body is bent or lowered in the act of walking, running, or leaping.

The distention of the springs is limited by cords or chains D, and to move the hook $l'$ out of the way of the spring S, whose end is connected with the rod R so as to slide freely thereon, the bell-crank $l$ is connected by means of a spring $s'$ and a loop of leather $l^2$, or a ring or like device, with the chain D. As one leg is moving forward and the other is about to be raised and bent to make the next forward move, there is sufficient strain upon the spring $s'$, the power of which is greater than that of spring $S'$, to overcome the tension of the latter, so that the crank-arm $l$ of lever L will be drawn backward, thereby causing the hook $l'$ to move forward out of contact with the rod R, and as the leg is bent the upper end of the bow-spring S slides up along said rod, as shown in Figs. 4 and 5. As the leg is straightened again the tension of the spring $s'$ on the lever L is removed, thus allowing the hook $l'$ to move into contact with the rod R. At the same time the end of the bow-spring S moves down said rod and pushes said hook out of the way, the spring S being thus again locked against vertical motion beyond the hook $l'$, so that when the body and legs are lowered the spring S will take up the weight thereof.

Instead of the lever and hook arrangement described, the block $e$, to which the end of the bow-spring S is connected, and which is adapted to slide on the rod R, may be provided in its front face with ratchet-teeth adapted to engage similar teeth formed on the lever-arm in lieu of the hook $l'$, as shown in Fig. 11. The block $e$ has two perforated ears $e'$, between which the end of the bow-spring is pivoted, as more plainly shown in Figs. 12 and 13. It is obvious, however, that the end of said bow-spring may simply be provided with an eye, through which the rod R passes freely.

It is obvious that the thigh or seat straps $B'$ may be dispensed with; but I prefer to use such, in order to more evenly distribute the stress of the bow-springs S over the legs and body. It is also obvious that the upper end of the said springs may be pivotally connected with the waist-belt; but, for reasons stated, I prefer to use the construction described.

Having described my invention, what I claim, and desire to secure by Letters Patent, is—

1. In an apparatus of the class described, a spring-support for the body, comprising two bow-springs having their opposite ends connected, respectively, to the waist and feet, in combination with a flexible connection between the spring extremes to limit the distention thereof, substantially as and for the purposes specified.

2. In an apparatus of the class described, a spring-support for the body, comprising two bow-springs having their extremes connected, respectively, with the feet and waist of such body, in combination with a locking device operating to lock the upper end of the springs against vertical motion, and means for operating said locking device to permit such motion to the springs operated and controlled thereby, substantially as and for the purposes specified.

3. In an apparatus of the class described, a spring-support for the body, comprising two bow-springs having their extremes connected, respectively, with the feet and waist of the body, in combination with means, substantially such as described, for preventing undue lateral spreading of the springs, and a flexible connection between the spring ends to limit the distention thereof, substantially as and for the purposes specified.

4. In an apparatus of the class described, a spring-support for the body, comprising two bow-springs having their extremes connected, respectively, with the feet and waist of the body, in combination with a flexible connection between the spring ends to limit the distention thereof, a locking device to lock the upper end of the springs against vertical motion, and means controlled by the springs for operating said locking device to release the upper end of the springs and permit them to move vertically, substantially as and for the purposes specified.

5. In an apparatus of the class described, a spring-support for the body, comprising two bow-springs having their extremes connected, respectively, with the feet and waist of the body, in combination with a retaining device connected with the legs to prevent undue lateral spread of the springs, a flexible connection between the spring ends to limit the distention thereof, a locking device to lock the upper end of the springs against vertical motion, and means controlled by the springs for operating said locking device to release the upper end of the springs and permit them to move vertically, substantially as and for the purposes specified.

6. In an apparatus of the class described, the combination, with the bow-springs S and the stirrups $s$, to which the lower end of the springs is connected, of the harness comprising a waist-belt, to which the upper end of said bow-springs is connected, inner and outer leg-straps $B^2$ $B^3$, connected with the waist-belt and with each other and constructed to form the stirrups $b^3$ for the feet, substantially as and for the purposes specified.

7. In an apparatus of the class described, the combination, with the bow-springs S and the stirrups $s$, to which the lower end of said springs is connected, of the harness comprising a waist-belt, to which the upper end of said bow-springs is connected, an inner and an outer leg-strap $B^2$ $B^3$, connected with the waist-belt and with each other and constructed to form the stirrups $b^3$ for the feet, and the thigh or seat straps or band $B'$, connected with said leg-straps and belt, and the cross brace or strap $b'$, connecting the thigh-bands, substantially as and for the purposes specified.

8. In an apparatus of the class described, the combination, with the bow-springs and the cords or chains D thereof, of the waist-belt B, provided with the guide-rod R, upon which the upper end of the springs is free to slide, the hook-levers L, their springs $S'$, and a resilient connection between the levers and the chains D, substantially as and for the purposes specified.

In testimony whereof I have signed my name to this specification in the presence of two subscribing witnesses.

NICHOLAS YAGN.

Witnesses:
N. TSCHEKALOFF,
F. KAUSSE.